United States Patent
Kim et al.

(10) Patent No.: US 9,141,248 B2
(45) Date of Patent: Sep. 22, 2015

(54) TOUCH PANEL WITH ELECTRODE PATTERN INCLUDING REGULAR PENTAGONS

(75) Inventors: Hyun Jun Kim, Gyunggi-do (KR); Youn Soo Kim, Seoul (KR); Ho Joon Park, Seoul (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 793 days.

(21) Appl. No.: 13/401,895

(22) Filed: Feb. 22, 2012

(65) Prior Publication Data
US 2013/0135222 A1    May 30, 2013

(30) Foreign Application Priority Data

Nov. 25, 2011  (KR) .................. 10-2011-0124581

(51) Int. Cl.
*G06F 3/045* (2006.01)

(52) U.S. Cl.
CPC ...... *G06F 3/045* (2013.01); *G06F 2203/04112* (2013.01)

(58) Field of Classification Search
CPC ................................ G06F 2203/04103; G06F 2203/04111–2203/04112

USPC .................................................. 345/173–178
See application file for complete search history.

(56) References Cited

U.S. PATENT DOCUMENTS

| 4,357,018 A * | 11/1982 | Calvert .................... 273/261 |
| 2011/0308846 A1* | 12/2011 | Ichiki ...................... 174/257 |
| 2011/0310037 A1* | 12/2011 | Moran et al. .............. 345/173 |

FOREIGN PATENT DOCUMENTS

| JP | 2002-014772 | 1/2002 |
| KR | 10-2010-0048932 | 5/2010 |
| KR | 10-2010-0091497 | 8/2010 |
| KR | 10-2011-0127236 | 11/2011 |

OTHER PUBLICATIONS

Office Action dated Aug. 26, 2014 for Korean Patent Application No. 10-2013-0068360 and its English summary provided by Applicant's foreign counsel.
Office Action dated Jan. 23, 2013 for related Korean Patent Application No. 10-2011-0124581 and its English summary.

* cited by examiner

*Primary Examiner* — Liliana Cerullo
(74) *Attorney, Agent, or Firm* — McDermott Will & Emery LLP

(57) ABSTRACT

Disclosed herein is a touch panel capable of preventing a moire phenomenon from being generated by forming an electrode pattern so as to have rotational symmetry rather than translation symmetry.

4 Claims, 9 Drawing Sheets

TOUCH PANEL WITH ELECTRODE PATTERN INCLUDING REGULAR PENTAGONS

CROSS REFERENCE TO RELATED APPLICATION

This application claims the benefit of Korean Patent Application No. 10-2011-0124581, filed on Nov. 25, 2011, entitled "Touch Panel", which is hereby incorporated by reference in its entirety into this application.

BACKGROUND OF THE INVENTION

1. Technical Field

The present invention relates to a touch panel.

2. Description of the Related Art

In accordance with the growth of computers using a digital technology, devices assisting computers have also been developed, and personal computers, portable transmitters and other personal information processors execute processing of text and graphics using a variety of input devices such as a keyboard and a mouse.

While the rapid advancement of an information-oriented society has been widening the use of computers more and more, it is difficult to efficiently operate products using only a keyboard and mouse currently serving as an input device. Therefore, the necessity for a device that is simple, has minimum malfunction, and is capable of easily inputting information has increased.

In addition, current techniques for input devices have progressed toward techniques related to high reliability, durability, innovation, designing and processing beyond the level of satisfying general functions. To this end, a touch panel has been developed as an input device capable of inputting information such as text, graphics, or the like.

This touch panel is mounted on a display surface of an image display device such as an electronic organizer, a flat panel display device including a liquid crystal display (LCD) device, a plasma display panel (PDP), an electroluminescence (El) element, or the like, and a cathode ray tube (CRT) to thereby be used to allow a user to select desired information while viewing the image display device.

Meanwhile, the touch panel is classified into a resistive type touch panel, a capacitive type touch panel, an electro-magnetic type touch panel, a surface acoustic wave (SAW) type touch panel, and an infrared type touch panel. These various types of touch panels are adapted for electronic products in consideration of a signal amplification problem, a resolution difference, a level of difficulty of designing and processing technologies, optical characteristics, electrical characteristics, mechanical characteristics, resistance to an environment, input characteristics, durability, and economic efficiency. Currently, the resistive type touch panel and the capacitive type touch panel have been prominently used in a wide range of fields.

Meanwhile, in the touch panel, research into a technology of forming an electrode pattern using a metal as disclosed in Korean Patent Laid-Open Publication No. 10-2010-0091497 has been actively conducted. As described above, when the electrode pattern is made of the metal, electric conductivity is excellent and demand and supply is smooth. However, in the case in which the electrode pattern is made of the metal, the electrode pattern should be formed in a mesh structure in a micrometer ($\mu$m) unit in order to prevent users from recognizing the electrode pattern. However, when the electrode pattern of the touch panel is formed in the mesh structure having regular and constant intervals, period characteristics of the electrode pattern of the touch panel and a black matrix pattern of a color filter included in an image display device (a liquid crystal display (LCD), or the like) are overlapped with each other, such that a moire phenomenon is generated, thereby deteriorating visibility.

SUMMARY OF THE INVENTION

The present invention has been made in an effort to provide a touch panel capable of preventing a moire phenomenon from being generated by forming an electrode pattern so as to have rotational symmetry rather than translation symmetry.

According to a first preferred embodiment of the present invention, there is provided a touch panel including an electrode pattern formed as a pattern including: a single first regular pentagon; and $(N-1) \times 5$ $N^{th}$ regular pentagons disposed to share outer sides of $N-1^{th}$ regular pentagons (where N indicates a natural number and is sequentially substituted with 2 to a specific number).

Lengths of sides of the first regular pentagon to the $N^{th}$ regular pentagon may be the same as each other.

A rhombus having two interior angles of 36 degrees and the other two interior angles of 144 degrees may be formed between two $N^{th}$ regular pentagons adjacent to each other and two $N+1^{th}$ regular pentagons adjacent to the two $N^{th}$ regular pentagons.

The touch panel may further include a transparent substrate having the electrode pattern formed thereon.

The electrode pattern may be made of copper (Cu), aluminum (Al), gold (Au), silver (Ag), titanium (Ti), palladium (Pd), chromium (Cr), or a combination thereof.

The electrode pattern may be made of metal silver formed by exposing and developing a silver halide emulsion layer.

According to a second preferred embodiment of the present invention, there is provided a touch panel including an electrode pattern formed as a pattern including: a first predetermined pattern to $N^{th}$ predetermined patterns (where N indicates a natural number and is sequentially substituted with 2 to a specific number) each configured of five first rhombuses having two interior angles of 72 degrees and the other two interior angles of 108 degrees and disposed to share two sides with each other based on predetermined apices having the interior angle of 72 degrees and five second rhombuses having two interior angles of 36 degrees and the other two interior angles of 144 degrees and disposed so that two sides thereof having the interior angle of 144 degrees share two sides of an outer side of two first rhombuses adjacent thereto, wherein the number of first predetermined pattern is 1 and the number of $N^{th}$ predetermined patterns is $(N-1) \times 5$, and the $(N-1) \times 5$ $N^{th}$ predetermined patterns are disposed so that the predetermined apices of the $N^{th}$ predetermined patterns form a regular $(N-1) \times 5$-gon based on the predetermined apex of the first predetermined pattern.

Lengths of sides of the first and second rhombuses may be the same as each other.

In the electrode pattern, third rhombuses having two interior angles of 72 degrees and the other two interior angles of 108 degrees and fourth rhombuses having two interior angles of 36 degrees and the other two interior angles of 144 degrees may be disposed at portions other than the first predetermined pattern to the $N^{th}$ predetermined patterns.

A length of a side of the third rhombus may be the same as that of the side of the first rhombus, and a length of a side of the fourth rhombus may be the same as that of the side of the second rhombus.

The touch panel may further include a transparent substrate having the electrode pattern formed thereon.

The electrode pattern may be made of copper (Cu), aluminum (Al), gold (Au), silver (Ag), titanium (Ti), palladium (Pd), chromium (Cr), or a combination thereof.

The electrode pattern may be made of metal silver formed by exposing and developing a silver halide emulsion layer.

DESCRIPTION OF THE PREFERRED EMBODIMENTS

Figure 1A:
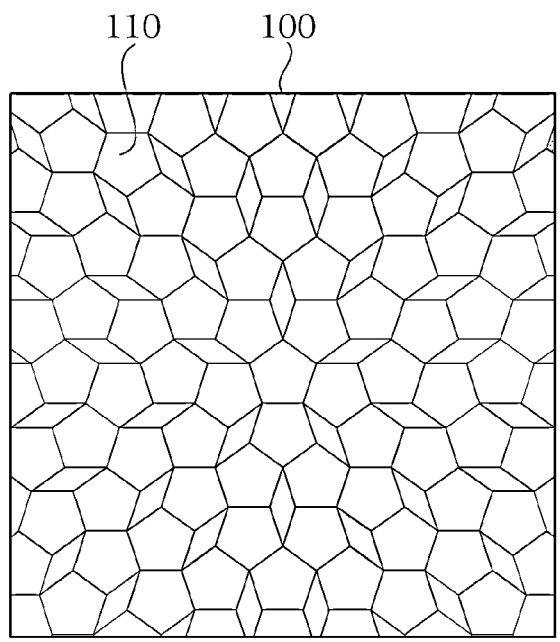
FIG. 1A is a plan view of a touch panel according to a first preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", and so on are used to distinguish one element from another element, and the elements are not defined by the above terms. Further, in describing the present invention, a detailed description of related known functions or configurations will be omitted so as not to obscure the subject of the present invention.

Hereinafter, preferred embodiments of the present invention will be described in detail with reference to the accompanying drawings.

Figure 1B:
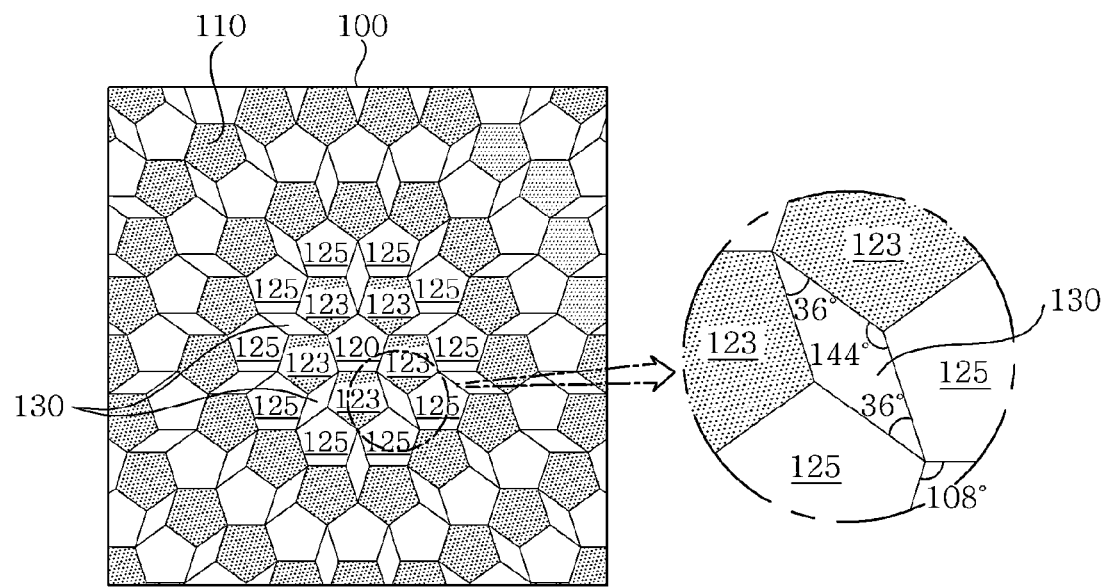
FIG. 1B is a plan view in which an enlarged view and a shadow are added in order to describe an electrode pattern shown in FIG. 1A.

FIG. 1A is a plan view of a touch panel according to a first preferred embodiment of the present invention; and FIG. 1B is a plan view in which an enlarged view and a shadow are added in order to describe an electrode pattern shown in FIG. 1A.

As shown in FIGS. 1A and 1B, the touch panel according to the present embodiment includes an electrode pattern 110 formed as a pattern including a single first regular pentagon 120 and (N−1)×5 $N^{th}$ regular pentagons disposed to share outer sides of N−$1^{th}$ regular pentagons (where N indicates a natural number and is sequentially substituted with 2 to a specific number).

The electrode pattern 110, which serves to generate a signal at the time of a touch by a user to allow a controller to recognize a touch coordinate, is formed on a transparent substrate 100. Here, the electrode pattern 110 may be made of copper (Cu), aluminum (Al), gold (Au), silver (Ag), titanium (Ti), palladium (Pd), chromium (Cr), or a combination thereof. In addition, the electrode pattern 110 may be formed by a plating process or a depositing process using a sputter. Meanwhile, in the case in which the electrode pattern 110 is made of copper (Cu), a surface of the electrode pattern 110 may be black-oxide treated. Here, the black-oxide treatment 110 indicates treatment in which $Cu_2O$ or $CuO$ is precipitated by oxidizing the surface of the electrode pattern 110, wherein the $Cu_2O$ is brown and is thus referred to as a brown oxide and the $CuO$ is black and is thus referred to as a black oxide. As described above, the surface of the electrode pattern 110 is black-oxide treated to prevent light from being reflected, thereby making it possible to improve visibility of the touch panel. Further, the electrode pattern 110 may also be made of metal silver formed by exposing and developing a silver halide emulsion layer, in addition to the above-mentioned metal.

Meanwhile, the electrode pattern 110 is formed as the pattern including the single first regular pentagon 120 and the (N−1)×5 $N^{th}$ regular pentagons disposed to share the outer sides of the N−$1^{th}$ regular pentagons. Where N indicates a natural number and is sequentially substituted with 2 to a specific number, and the outer side of the N−$1^{th}$ regular pentagon means a single side or two sides most distant from a side shared with a N−$2^{th}$ regular pentagon among sides of the N−$1^{th}$ regular pentagon. For example, based on the single first regular pentagon 120, five second regular pentagons 123 are disposed to share outer sides of the first regular pentagon 120 and ten third regular pentagons 125 are disposed to share outer sides of the second regular pentagons 123. As a result, the $N^{th}$ regular pentagons are extended from the first regular pentagon 120 to the outside while sharing the outer sides of the N−$1^{th}$ regular pentagons. Here, in order for the $N^{th}$ regular pentagons to share the outer sides of the N−$1^{th}$ regular pentagons, lengths of sides of the first regular pentagon 120 to the $N^{th}$ regular pentagon need to be the same as each other.

In addition, when the first regular pentagon 120 to the $N^{th}$ regular pentagons are disposed as described above, a rhombus 130 having two interior angles of 36 degrees and the other two interior angles of 144 degrees is formed between two $N^{th}$ regular pentagons adjacent to each other and two N+$1^{th}$ regular pentagons adjacent thereto. For example, as shown in the enlarged view of FIG. 1B, the rhombus 130 having two interior angles of 36 degrees and the other two interior angles of 144 degrees is formed between two regular pentagons 123 adjacent to each other and two third regular pentagons 125 adjacent thereto. However, facing sides of the $N^{th}$ regular pentagons adjacent to each other form an angle of 36 degrees or 108 degrees. The rhombus 130 is formed when the facing surfaces of the $N^{th}$ regular pentagons adjacent to each other form an angle of 36 degrees.

As a result, the electrode pattern 110 is formed as a pattern including the regular pentagons 120, 123, and 125 and the rhombus 130 (of which two interior angles are 36 degrees and the other two interior angles are 144 degrees).

Figure 2:
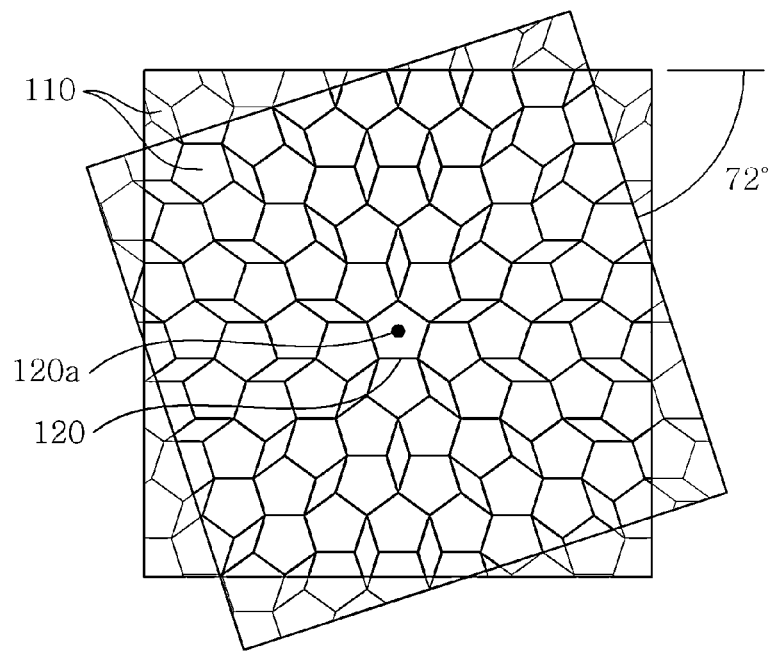
FIG. 2 is a plan view showing rotational symmetry of the electrode pattern shown in FIG. 1A.

When the electrode pattern 110 is formed as the pattern including the regular pentagons 120, 123, and 125 and the rhombus 130 as described above, the electrode pattern 110 has rotational symmetry rather than translation symmetry. Here, the translation symmetry means that when an original pattern is moved by a predetermined distance in a predetermined direction, upper and lower and left and right parts of the moved pattern are not changed from those of the original pattern, and the rotational symmetry means that when original pattern is rotated by a predetermined angle, a shape of the rotated pattern coincides with that of the original pattern. More specifically, as shown in FIG. 2, which is a plan view showing rotational symmetry of the electrode pattern shown in FIG. 1A, the electrode pattern 110 has a shape coinciding with that of an original pattern when it is rotated by 72 degrees based on the center 120a of the first regular pentagon 120. Through this, it may be appreciated that the electrode pattern 110 has the rotational symmetry.

As a result, the electrode pattern 110 of the touch panel has the rotational symmetry; however, since a black matrix pattern of a color filter included in an image display device (a liquid crystal display (LCD), or the like) has a periodic lattice structure, it has the translation symmetry. Therefore, period characteristics of the electrode pattern 110 and the black matrix pattern are not overlapped with each other, thereby making it possible to prevent a moire phenomenon from being generated.

More specifically, an example in which the moire phenomenon is not generated will be described with reference to FIGS. 3 to 5.

Figure 3:
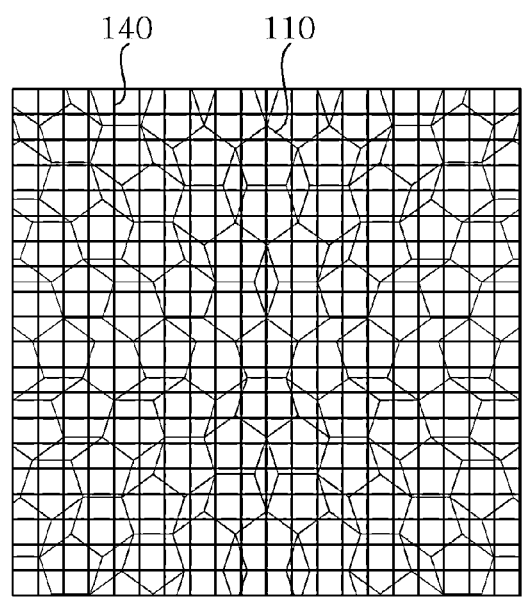
FIGS. 3 to 5 are plan views showing a state in which a black matrix pattern of a color filter is overlapped with the electrode pattern of FIG. 1A.
Figure 4:
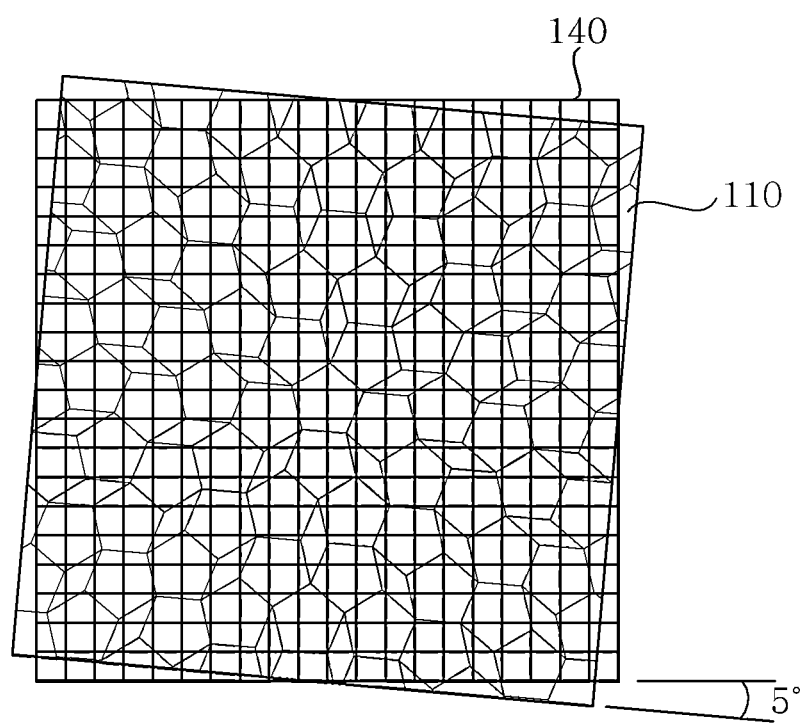
Figure 5:
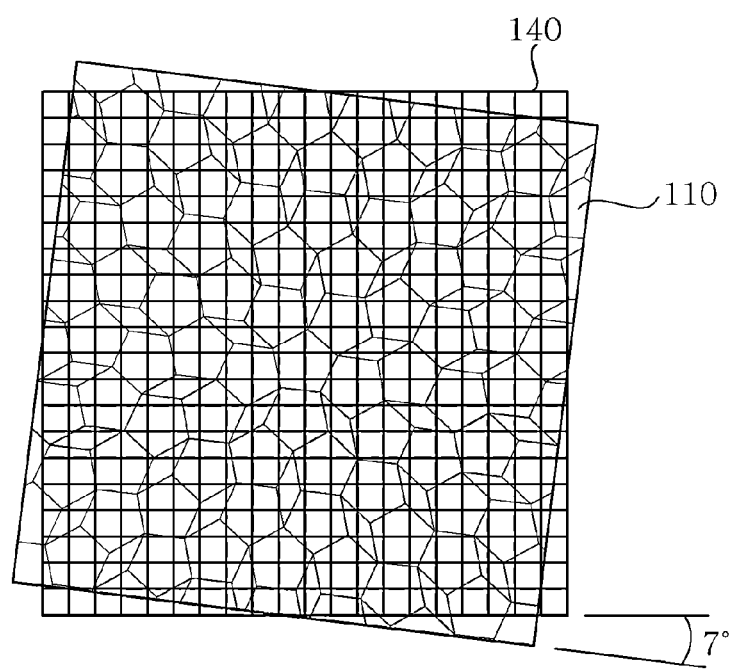

FIGS. 3 to 5 are plan views showing a state in which a black matrix pattern of a color filter is overlapped with the electrode pattern of FIG. 1A.

As shown in FIG. 3, the electrode pattern 110 has the rotational symmetry; however, a black matrix pattern 140 of a color filter included in an image display device (a liquid crystal display (LCD), or the like) has the translation symmetry (the periodic lattice structure). As a result, even though the electrode pattern 110 and the black matrix pattern 140 are disposed to be overlapped with each other, generation of an interference phenomenon may be minimized, such that the moire phenomenon may be prevented.

In addition, as shown in FIGS. 4 and 5, even through the electrode pattern 110 the black matrix pattern 140 rotates from a state in which they are overlapped with each other up to 5 degrees (See FIG. 4) to 7 degrees (See FIG. 5), the generation of an interference phenomenon may also be minimized, such that the moire phenomenon may be prevented.

Furthermore, since the electrode pattern 110 has quasi-periodic characteristics (rotational symmetry), an aperture ratio per unit area of the electrode pattern 110 may be maintained to be constant, such that the touch panel may secure uniform electric conductivity and visibility.

Meanwhile, the electrode pattern 110 is formed on the transparent substrate 100 (See FIG. 1A). Here, the transparent substrate 110 needs to have support force capable of supporting the electrode pattern 110 and transparency capable of allowing a user to recognize an image provided from the image display device. In consideration of the support force and the transparency described above, the transparent substrate 100 may be made of polyethylene terephthalate (PET), polycarbonate (PC), poly methyl methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, poly-styrene (PS), biaxially oriented polystyrene (BOPS; containing K resin), glass, tempered glass, or the like, but is not necessarily limited thereto.

Additionally, in order to activate the transparent substrate 100, high frequency treatment or primer treatment may be performed. As described above, the transparent substrate 100 is activated, thereby making it possible to improve adhesion between the transparent substrate 110 and the electrode pattern 110.

In addition, the transparent substrate 110 may be a window provided at the leftmost portion of the touch panel. In the case in which the transparent substrate 100 is the window, since the electrode pattern 110 is formed directly on the window, a process of forming the electrode pattern 110 on a separate transparent substrate 100 and then attaching the transparent substrate 100 to the window is omitted, thereby making it possible to simplify a manufacturing process and reduce the entire thickness of the touch panel.

Figure 6A:
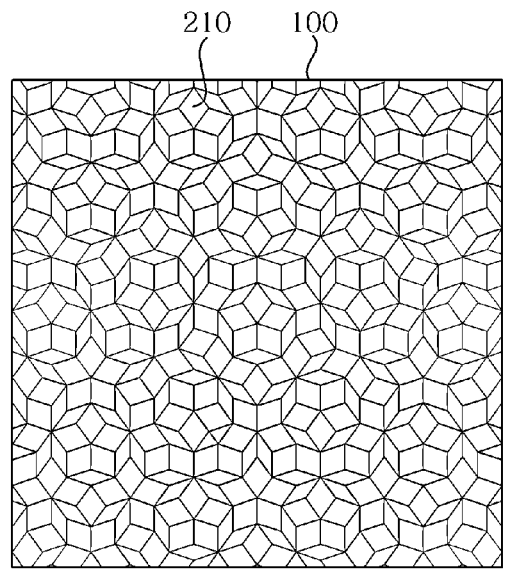
FIG. 6A is a plan view of a touch panel according to a second preferred embodiment of the present invention.
Figure 6B:
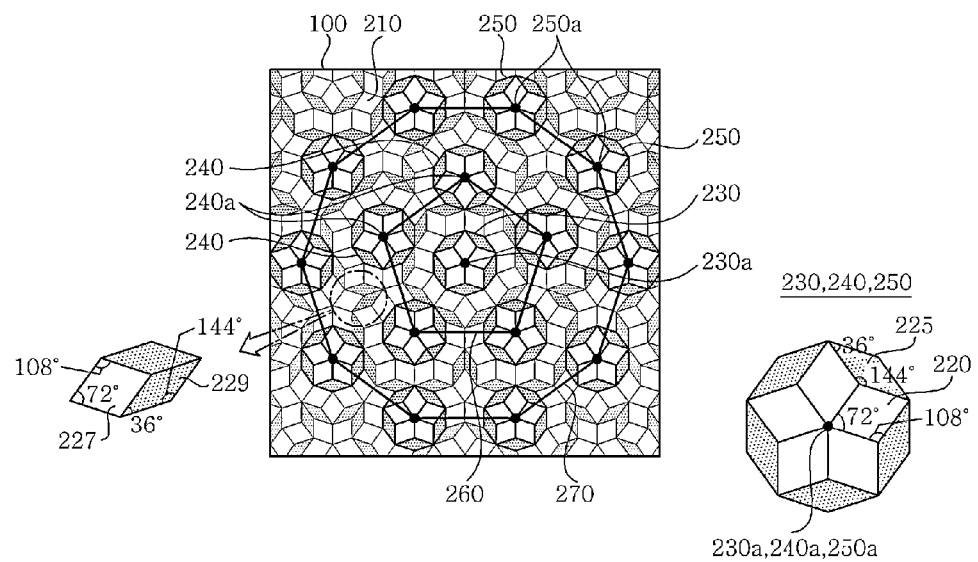
FIG. 6B is a plan view in which an enlarged view, a shadow, an auxiliary line, and a thick line are added in order to describe an electrode pattern shown in FIG. 6A.

FIG. 6A is a plan view of a touch panel according to a second preferred embodiment of the present invention; and FIG. 6B is a plan view in which an enlarged view, a shadow, an auxiliary line, and a thick line are added in order to describe an electrode pattern shown in FIG. 6A.

As shown in FIGS. 6A and 6B, the touch panel according to the present embodiment includes an electrode pattern 210 formed as a pattern including a first predetermined pattern 230 to $N^{th}$ predetermined patterns (where N indicates a natural number and is sequentially substituted with 2 to a specific number) each configured of five first rhombuses 220 having two interior angles of 72 degrees and the other two interior angles of 108 degrees and disposed to share two sides with each other based on predetermined apices 230a, 240a, and 250a having the interior angle of 72 degrees and five second rhombuses 225 having two interior angles of 36 degrees and the other two interior angles of 144 degrees and disposed so that two sides thereof having the interior angle of 144 degrees share two sides of an outer side of two first rhombuses 220 adjacent thereto (See an enlarged view of the right of FIG. 6B), wherein the number of first predetermined pattern 230 is 1 and the number of $N^{th}$ predetermined patterns is $(N-1) \times 5$, and the $(N-1) \times 5$ $N^{th}$ predetermined patterns are disposed so that the predetermined apices 240a and 250a of the $N^{th}$ predetermined patterns form a regular $(N-1) \times 5$-gon based on the predetermined apex 230a of the first predetermined pattern 230.

The touch panel according to the present embodiment is different in the electrode pattern 210 from the touch panel according to the first preferred embodiment of the present invention described above. Therefore, in the present invention, the electrode pattern 210 will be mainly described and a content overlapped with that of the first preferred embodiment of the present invention described above will be briefly described.

The electrode pattern 210, which serves to generate a signal at the time of a touch by a user to allow a controller to recognize a touch coordinate, is formed on a transparent substrate 100. Here, the electrode pattern 210 may be made of copper (Cu), aluminum (Al), gold (Au), silver (Ag), titanium (Ti), palladium (Pd), chromium (Cr), or a combination thereof. Further, the electrode pattern 210 may also be made of metal silver formed by exposing and developing a silver halide emulsion layer, in addition to the above-mentioned metal.

Meanwhile, the electrode pattern 210 is formed as a pattern including the first predetermined pattern 230 to the $N^{th}$ predetermined patterns (second predetermined patterns 240 and third predetermined patterns 250), where N indicates a natural number and is sequentially substituted with 2 to a specific number. In addition, as shown in the enlarged view of the right of FIG. 6B, each of the first predetermined pattern 230 to the $N^{th}$ predetermined patterns (second predetermined patterns 240 and third predetermined patterns 250) is configured of the first rhombus 220 and the second rhombus 225. Here, the first rhombus 220 has two interior angles of 72 degrees and the other two interior angles of 108 degrees, and the second rhombus 225 has two interior angles of 36 degrees and the other two interior angles of 144 degrees. Here, five first rhombuses 220 are provided and are disposed to share two sides with each other based on the predetermined apices 230a, 240a, and 250a having the interior angle of 72 degrees. In addition, five second rhombuses 225 are provided and are disposed so that two sides thereof having the interior angle of 144 degrees share two sides of an outer side of two first rhombuses 220 adjacent thereto. That is, the first predetermined pattern 230 to the $N^{th}$ predetermined patterns (second predetermined patterns 240 and third predetermined patterns 250) are disposed so that each of the five first rhombuses 220 forms 72 degrees, that is, the five first rhombuses 220 form a total of 360 degrees, and the five second rhombuses 225 share sides with the five first rhombuses 220 at an outer side of the five first rhombuses 220. Here, in order for the first and second rhombuses 220 and 225 to share the sides with each other, lengths of the sides of the first and second rhombuses 220 and 225 need to be the same as each other.

In addition, the number of first predetermined pattern 230 is one, and the number of $N^{th}$ predetermined patterns is (N−1)×5 (for example, the number of second predetermined patterns 240 is five and the number of third predetermined patterns 250 is ten). Here, the (N−1)×5 $N^{th}$ predetermined patterns are disposed so that the predetermined apices 240a and 250a of the $N^{th}$ predetermined patterns form a regular (N−1)×5-gon based on the predetermined apex 230a of the first predetermined pattern 230. For example, five second predetermined patterns 210 are disposed so that the predetermined apices 240a of the second predetermined patterns 240 form a regular pentagon 250 based on the predetermined apex 230a of the first predetermined pattern 230, and ten third predetermined patterns 250 are disposed so that the predetermined apices 250a of the third predetermined patterns 250 form a regular decagon 270 based on the predetermined apex 230a of the first predetermined pattern 230.

Meanwhile, third rhombuses 227 having two interior angles of 72 degrees and the other two interior angles of 108 degrees and fourth rhombuses 229 having two interior angles of 36 degrees and the other two interior angles of 144 degrees are disposed at portions other than the first predetermined pattern 230 to the $N^{th}$ predetermined patterns among the patterns forming the electrode pattern 210 (See an enlarged view of the left of FIG. 6B). Here, a length of a side of the third rhombus 227 is the same as that of the side of the first rhombus 220, and a length of a side of the fourth rhombus 229 is the same as that of the side of the second rhombus 225. As a result, the electrode pattern 210 is formed as a pattern configured of rhombuses (the first and third rhombuses 220 and 227) having two interior angles of 72 degrees and the other two interior angles of 108 degrees and rhombuses (the second and fourth rhombuses 225 and 229) having two interior angles of 36 degrees and the other two interior angles of 144 degrees.

Figure 7:
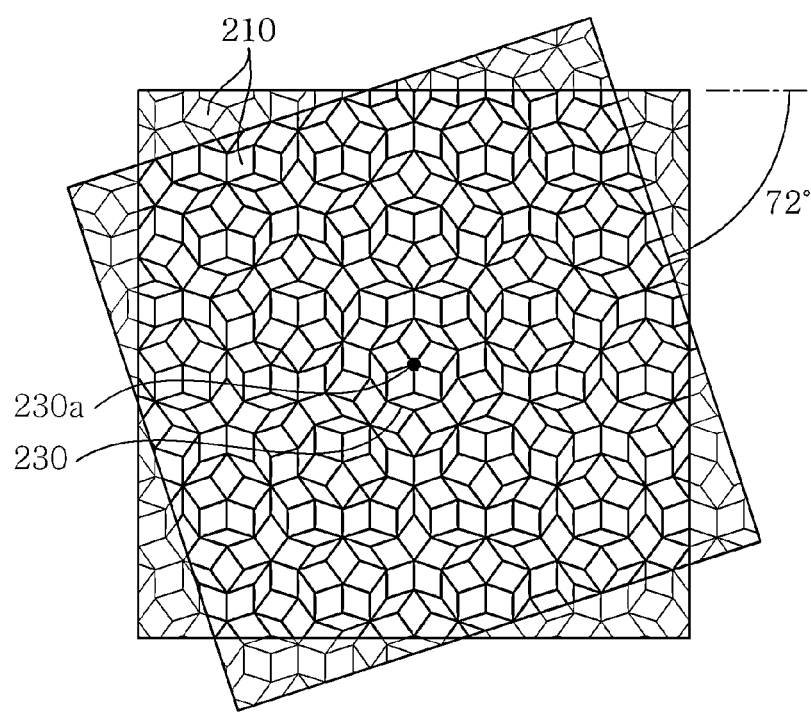
FIG. 7 is a plan view showing rotational symmetry of the electrode pattern shown in FIG. 6A.

As described above, when the electrode pattern 210 is formed as the pattern configured of the first to fourth rhombuses 220, 225, 227, and 229, the electrode pattern 210 has rotational symmetry rather than translation symmetry. More specifically, as shown in FIG. 7, which is a plan view showing rotational symmetry of the electrode pattern shown in FIG. 6A, the electrode pattern 210 has a shape coinciding with that of an original pattern when it is rotated by 72 degrees based on the predetermined apex 230a of the first predetermined pattern 230. Through this, it may be appreciated that the electrode pattern 210 has the rotational symmetry.

As a result, the electrode pattern 210 of the touch panel has the rotational symmetry; however, since a black matrix pattern of a color filter included in an image display device (a liquid crystal display (LCD), or the like) has a periodic lattice structure, it has the translation symmetry. Therefore, period characteristics of the electrode pattern 210 and the black matrix pattern are not overlapped with each other, thereby making it possible to prevent a moire phenomenon from being generated.

More specifically, an example in which the moire phenomenon is not generated will be described with reference to FIGS. 8 to 10.

Figure 8:
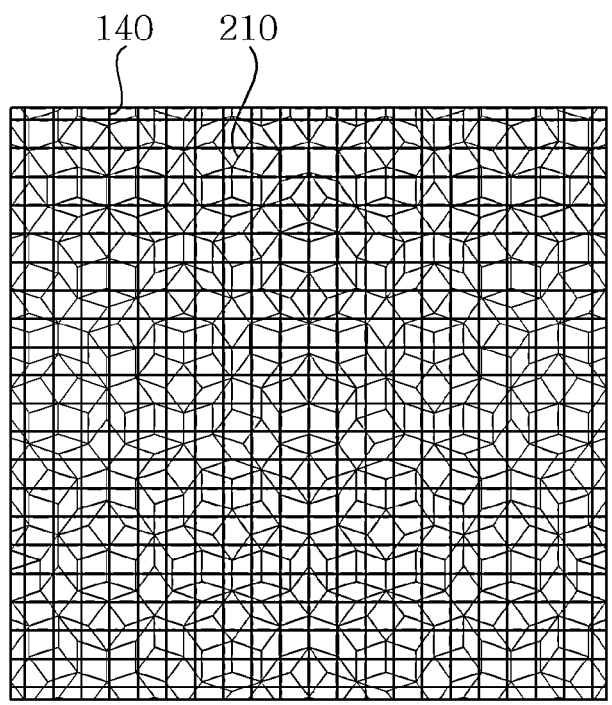
FIGS. 8 to 10 are plan views showing a state in which a black matrix pattern of a color filter is overlapped with the electrode pattern of FIG. 6A.
Figure 9:
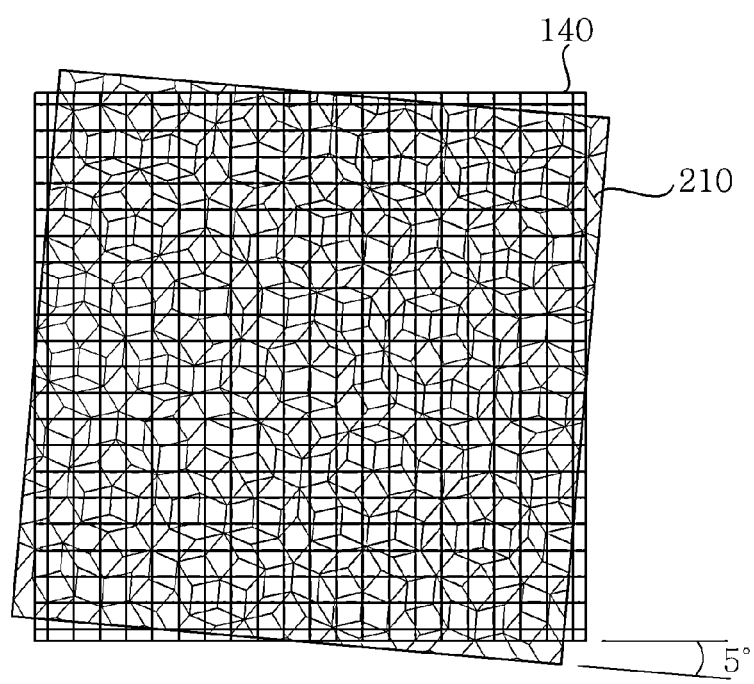
Figure 10:
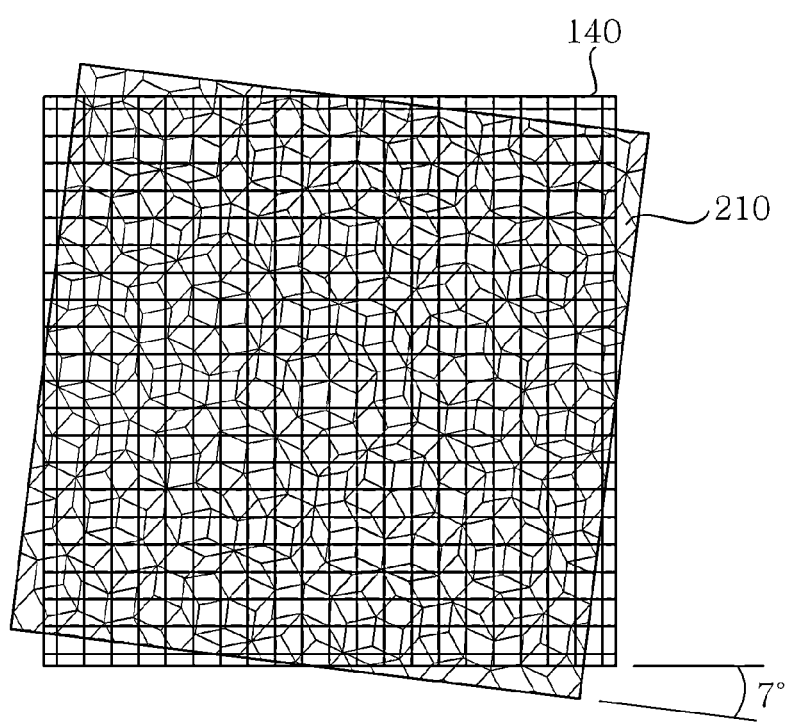

FIGS. 8 to 10 are plan views showing a state in which a black matrix pattern of a color filter is overlapped with the electrode pattern of FIG. 6A.

As shown in FIG. 8, the electrode pattern 210 has the rotational symmetry; however, a black matrix pattern 140 of a color filter included in an image display device (a liquid crystal display (LCD), or the like) has the translation symmetry (the periodic lattice structure). As a result, even though the electrode pattern 210 and the black matrix pattern 140 are disposed so as to be overlapped with each other, generation of an interference phenomenon may be minimized, such that the moire phenomenon may be prevented.

In addition, as shown in FIGS. 9 and 10, even through the electrode pattern 210 the black matrix pattern 140 rotates from a state in which they are overlapped with each other up to 5 degrees (See FIG. 9) to 7 degrees (See FIG. 10), the generation of an interference phenomenon may also be minimized, such that the moire phenomenon may be prevented.

Furthermore, since the electrode pattern 210 has quasi-periodic characteristics (rotational symmetry), an aperture ratio per unit area of the electrode pattern 210 may be maintained to be constant, such that the touch panel may secure uniform electric conductivity and visibility.

Meanwhile, the electrode pattern 210 is formed on the transparent substrate 100 (See FIG. 6A). Here, the transparent substrate 100 may be made of polyethylene terephthalate (PET), polycarbonate (PC), poly methyl methacrylate (PMMA), polyethylene naphthalate (PEN), polyethersulfone (PES), a cyclic olefin polymer (COC), a triacetylcellulose (TAC) film, a polyvinyl alcohol (PVA) film, a polyimide (PI) film, polystyrene (PS), biaxially oriented polystyrene (BOPS; containing K resin), glass, tempered glass, or the like, but is not necessarily limited thereto.

As set forth above, according to the preferred embodiments of the present invention, since the electrode pattern has the rotational symmetry rather than the translation symmetry, the generation of the moire phenomenon may be prevented, such that visibility of the touch panel may be improved.

In addition, according to the preferred embodiments of the present invention, since the electrode pattern has quasi-periodic characteristics, an aperture ratio per unit area of the electrode pattern may be maintained to be constant, such that the touch panel may secure uniform electric conductivity and visibility.

Although the preferred embodiments of the present invention have been disclosed for illustrative purposes, they are for specifically explaining the present invention and thus a touch panel according to the present invention is not limited thereto, but those skilled in the art will appreciate that various modifications, additions and substitutions are possible, without departing from the scope and spirit of the invention as disclosed in the accompanying claims. Accordingly, any and all modifications, variations or equivalent arrangements should be considered to be within the scope of the invention, and the detailed scope of the invention will be disclosed by the accompanying claims.

What is claimed is:

1. A touch panel comprising:
   a transparent substrate; and
   an electrode pattern formed on the transparent substrate and having rotational symmetry rather than translation symmetry,
   wherein the electrode pattern is formed as a pattern including:
   a single first regular pentagon; and
   $(N-1) \times 5$ $N^{th}$ regular pentagons disposed to share outer sides of $N-1^{th}$ regular pentagons (where N indicates a natural number and is sequentially substituted with 2 to a specific number),
   wherein the specific number is greater than or equal to 4, and
   wherein lengths of sides of the first regular pentagon to the $N^{th}$ regular pentagon are the same as each other.

2. The touch panel as set forth in claim 1, wherein a rhombus having two interior angles of 36 degrees and the other two interior angles of 144 degrees is formed between two $N^{th}$ regular pentagons adjacent to each other and two $N+1^{th}$ regular pentagons adjacent to the two $N^{th}$ regular pentagons.

3. The touch panel as set forth in claim 1, wherein the electrode pattern is made of copper (Cu), aluminum (Al), gold (Au), silver (Ag), titanium (Ti), palladium (Pd), chromium (Cr), or a combination thereof.

4. The touch panel as set forth in claim 1, wherein the electrode pattern is made of metal silver formed by exposing and developing a silver halide emulsion layer.

* * * * *